United States Patent [19]

Hayashi et al.

[11] 4,276,572

[45] Jun. 30, 1981

[54] AUTOMATIC MESSAGE ANNOUNCEMENT SYSTEM

[75] Inventors: Yoshiro Hayashi; Akira Sugihara; Takaki Shimura, all of Tokyo; Kozo Ishikawa, Yokohama; Kiyoshi Wada; Eiji Yamanaka, both of Toyko; Shunsuke Senba, Yokohoma, all of Japan

[73] Assignees: Japanese National Railways; Fujitsu Limited; Fujitsu Kiden Ltd., all of Japan

[21] Appl. No.: 88,639

[22] Filed: Oct. 26, 1979

Related U.S. Application Data

[63] Continuation-in-part of Ser. No. 883,170, Mar. 3, 1978.

[30] Foreign Application Priority Data

Sep. 11, 1976 [JP] Japan .............................. 51-108963

[51] Int. Cl.[3] .............................................. G11B 5/00

[52] U.S. Cl. ..................................................... 360/12

[58] Field of Search ............. 340/27 R, 181; 364/436; 360/12

[56] References Cited

U.S. PATENT DOCUMENTS 4,023,146 5/1977 Carroll ................................ 364/436

4,093,938 6/1978 Argentieri et al. .................... 360/12

*Primary Examiner*—Vincent P. Canney

*Attorney, Agent, or Firm*—Staas & Halsey

[57] ABSTRACT

An automatic message announcement system for announcing the approach, arrival, and departure of vehicles such as trains at a train station. An addressable voice memory is provided for storing sequences of voice segments which are read out upon receipt of announcement command input signals to form messages for announcing that a vehicle is approaching or has arrived or is departing, with specific information such as the vehicle's destination being included in the announcement by inserting the appropriate voice segments at the proper points in the sequence. The messages are composed in such a manner that the sequences of voice segments can be altered to form shorter, but still intelligible, messages if vehicles traffic is so heavy that one message is due for announcement before the previous announcement is completed. A priority selection circuit is provided for giving priority to the announcement command input signals, along with a memory for storing the addresses of the voice segments, a control circuit for reading out the memory content on the basis of the announcement command input signals and generating a message pattern to be announced, and an edition control circuit for supplying the appropriate addresses to the voice memory so that the proper voice segments can be read out in the desired sequence in order to produce the announcements.

14 Claims, 5 Drawing Figures

FIG. 2-(1)
FIG. 2-(2)
FIG. 2-(1)
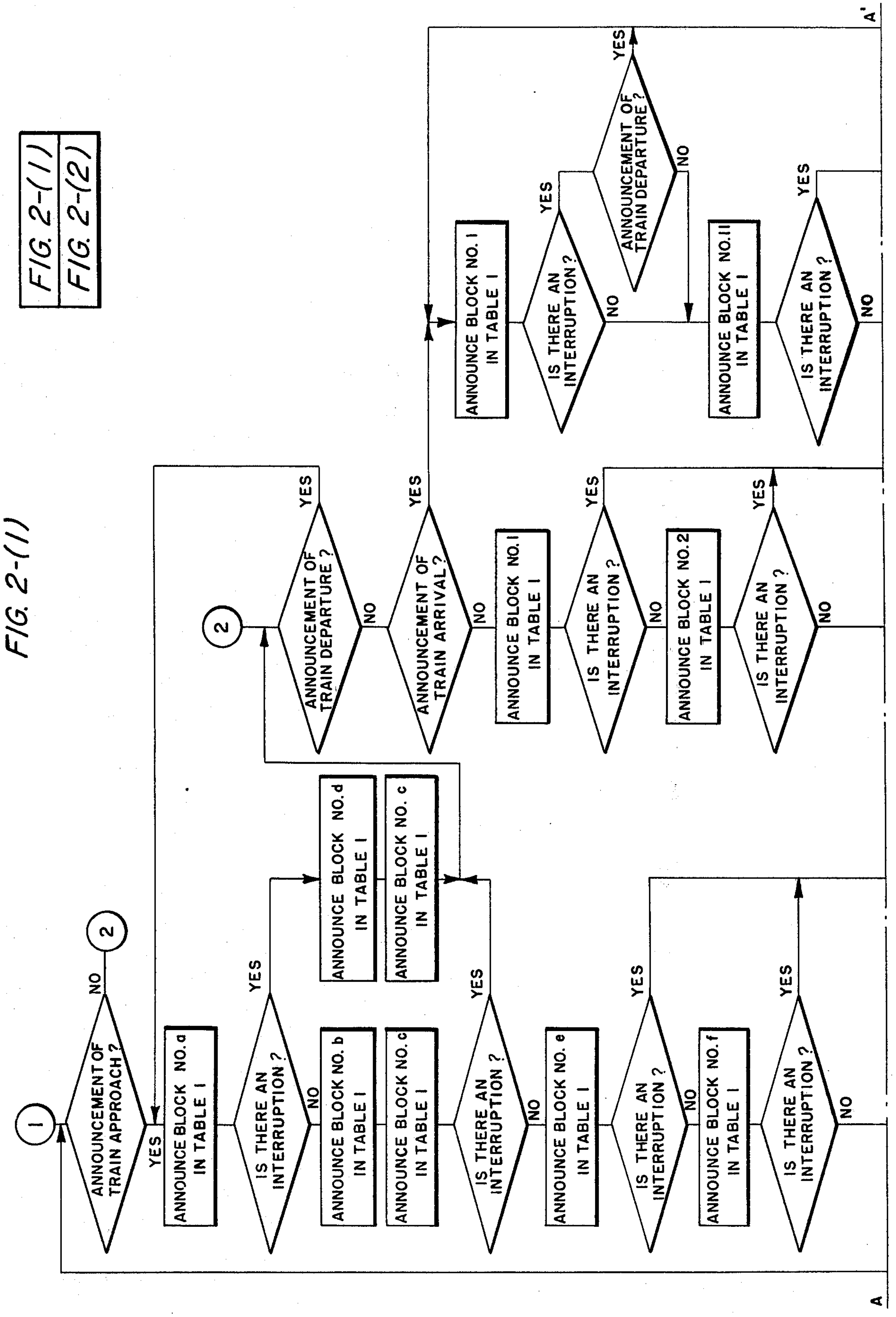

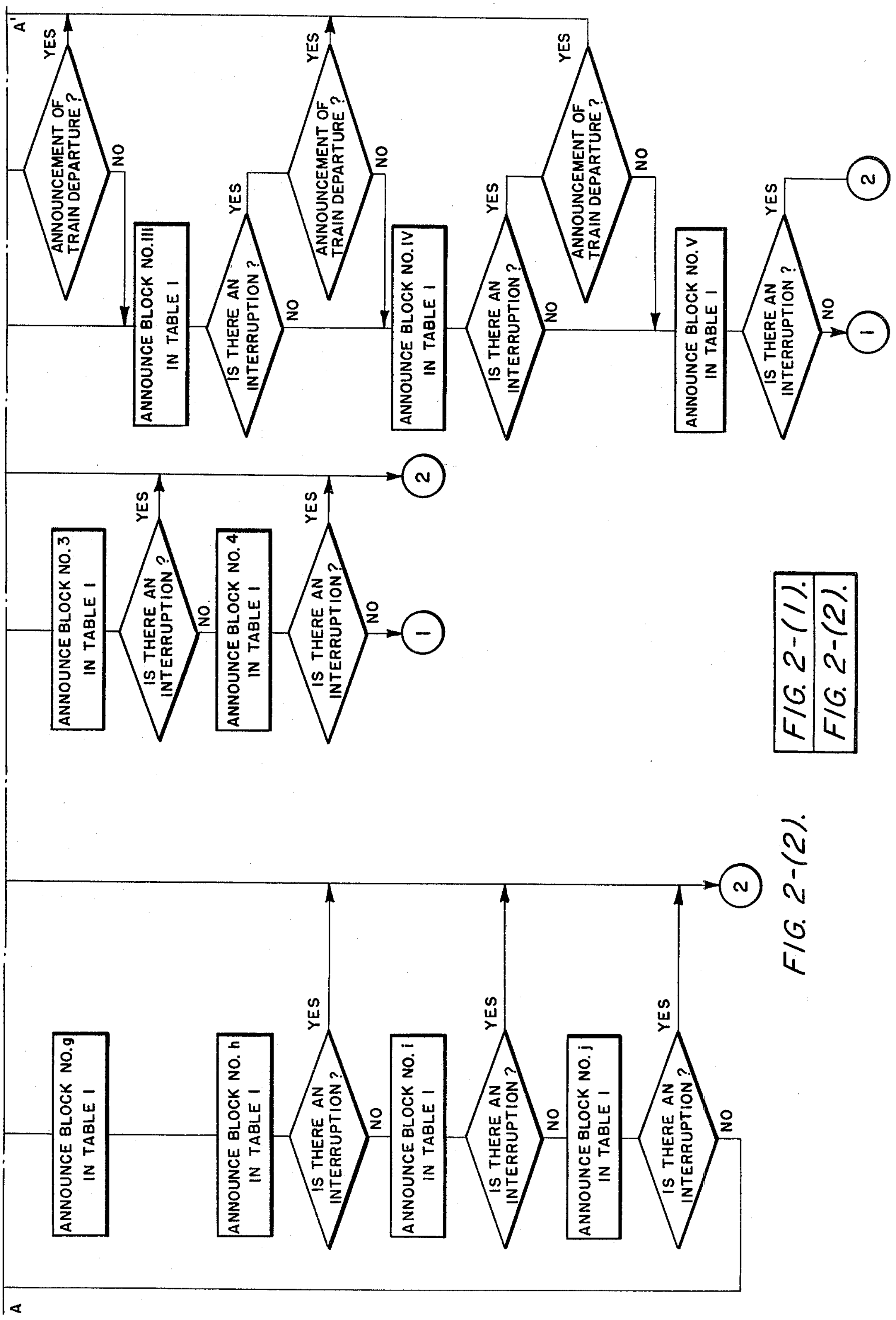
FIG. 2-(2).

AUTOMATIC MESSAGE ANNOUNCEMENT SYSTEM

CROSS REFERENCE TO RELATED APPLICATION

This is a continuation-in-part of U.S. application Ser. No. 883,170, filed Mar. 3, 1978.

BACKGROUND OF THE INVENTION

This invention relates to an automatic message announcement system, particularly to an automatic announcement system suitable for automatically announcing messages in the premises of a railroad station.

Usually, train information is announced at the platforms in any railroad station. The announcements are usually performed by a person in charge of the relevant platform, but recently such announcements have been carried out automatically for labor saving purposes.

In the case of an island-type platform which allows departure or arrival of "up-trains" on one side and "down-trains" on the other, both an up-train and a down-train often arrive at the same time, or one train leaves as another train arrives. In such cases, existing automatic announcement service systems cannot perform adequately. For example, if an up-train has arrived and immediately after that a down-train arrives, existing automatic announcement service systems will announce the arrival of the up-train and then announce the arrival of the down-train. In existing automatic message announcement service systems, messages of predetermined length are recorded onto a magnetic tape and relevant messages are all announced in accordance with the approach, arrival and departure of trains.

Therefore, if the arrival of the down-train is announced after completion of the announcement for the arrival of the up-train, as explained in the above example, a considerable time may have passed after the down-train has arrived at the platform. This delay may be distasteful to the passengers, and such announcement services cannot be said to be sufficient. Such disadvantages are also observed during announcements for train departures and approaches, in addition to the case of train arrivals.

BRIEF SUMMARY OF INVENTION

The purpose of the present invention is to eliminate the existing disadvantages mentioned above. An object of this invention is to provide an automatic message announcement system which is capable of interrupting an announcement or simplifying the message when another message must be announced before completion of the previous one, and which can add to the content of a message.

Another object of this invention is to provide an automatic message announcement system wherein a priority sequence is given to a plurality of announcement command input signals in accordance with their importance. If there is a request for an interruption during the announcement of a message, the message being announced may be interrupted or simplified, and thereafter a new message combining the remaining content of the interrupted message and the message of the interruption request is announced, or the message having the higher priority is announced.

Another object of this invention is to provide a system for selectively announcing specified voice segments in accordance with the message to be announced, by providing a voice memory which stores various voice segments consisting of relevant messages.

A further object of this invention is to offer an improved service to railroad (or other) passengers wherein an announcement input signal is used as the announcement request for informing passengers at the station platform about the arrival and departure of both up-trains and down-trains and simultaneously a priority sequence is given to each message by the following relations, approach<arrival<departure of trains, and whereby an automatic announcement is carried out in accordance with said priority sequence.

Briefly, these and other advantages are obtained by selectively stringing together voice segments previously stored in an addressable voice recording medium. Generalized messages for announcing the approach, arrival, and departure of trains are broken into a series of segments for storage in the voice recording medium, with the most important parts of the messages being included in the initial segments of the series so that vital information will not be lost if it is necessary to edit or truncate the series. The generalized messages are made specific by leaving places in the generalized messages for inclusion of relevant information, such as destination and time of departure, which is also stored in the voice recording medium. The approach, arrival, and departure messages are assigned priorities depending upon their relative importance to the passengers at the platform, it being assumed, for example, that it is more important to inform waiting passengers that a train is departing than that another train is approaching. When a first message is being announced when it is time to announce a second message, the relative priorities of the messages are compared and the first message may be shortened by re-selecting the sequence of addresses to be applied to the voice recording medium. In this way complete approach, arrival, and departure messages are announced to passengers at the platform if there is time to do so, and the most important information is conveyed if there is not.

BRIEF DESCRIPTION OF THE DRAWINGS

FIG. 2 is a flowchart of the automatic message announcement related to this invention;

DESCRIPTION OF THE PREFERRED EMBODIMENTS

Figure 1:
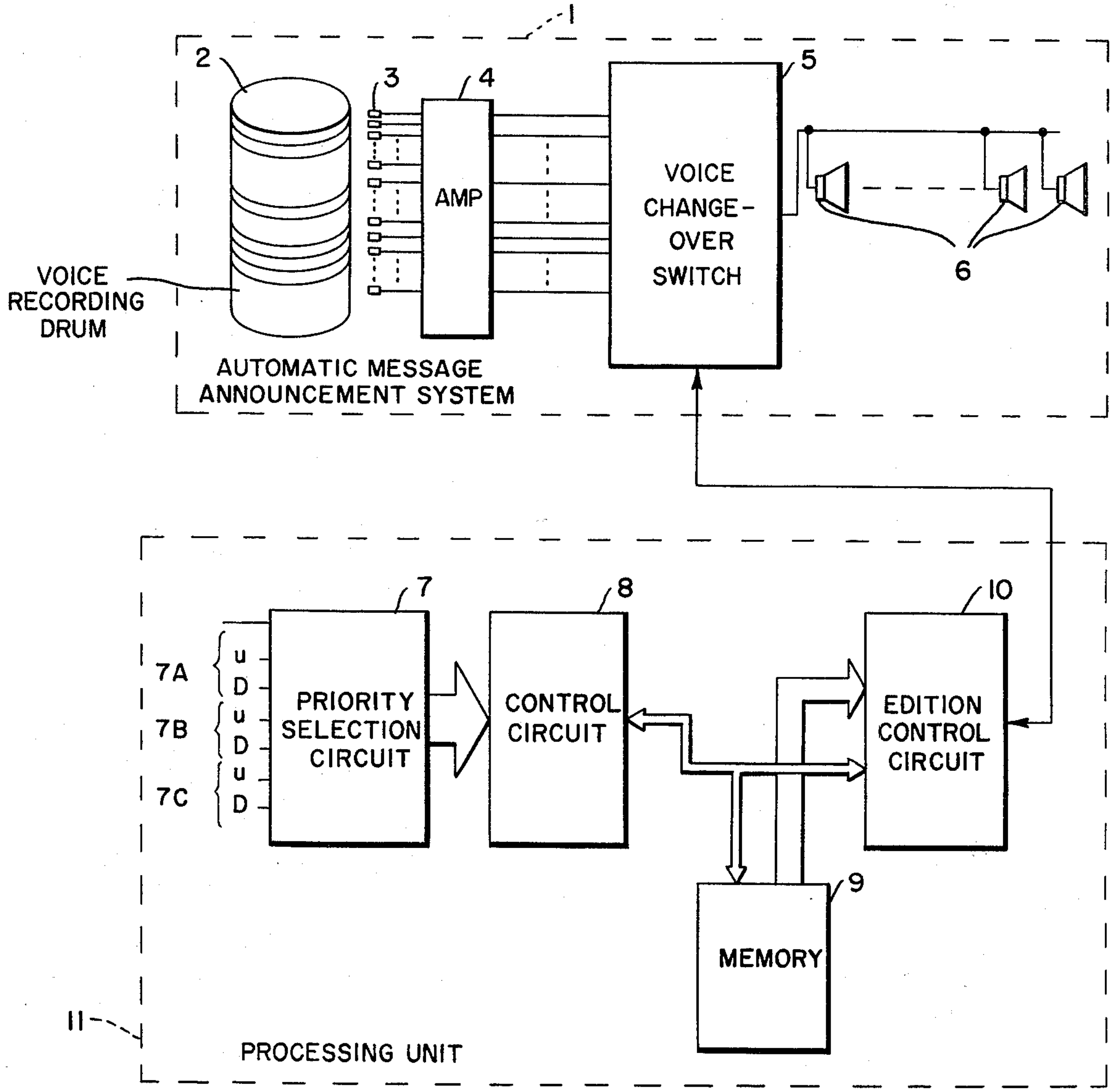
FIG. 1 is a schematic block diagram illustrating an embodiment of this invention.

FIG. 1 is the block diagram of an embodiment of this invention. In this figure, numeral 1 represents an addressable automatic message announcement system, consisting of a voice recording drum 2, read-out heads 3, amplifier 4, voice change-over switch 5 and loud speakers 6. Such automatic message announcement systems are known in the art. One such system is disclosed, for example, in Japanese patent application No. 50-82903, which was laid-open by the Japanese Patent Office on July 4, 1975.

The read-out heads 3 are arranged face to face with the tracks on the voice recording drum 2 and read out the messages recorded on the tracks. Thus, the messages read out from the voice recording drum 2, through the change-over as required by the voice change-over switch 5, are announced to the passengers on the platform from the loud speakers 6. It will be apparent to those skilled in the art that relatively long messages may be broken into segments which are recorded on the individual tracks of drum 2, and that these relatively long messages can later be re-constructed for announcement by selecting different heads 3 in the appropriate sequence once per drum revolution. Of more importance here it will be apparent that different versions of the same basic messages may be recorded, with the sequence of heads selected determining which version is announced. Moreover, a generalized message may be infused with particular information by reading out the tracks which contain the particular information at the appropriate point in the sequence. For this purpose a number of tracks may be reserved for recording various destinations, digits, etc., in order to provide particular information. Voice change-over switch 5 is employed in addressing the voice memory by changing the effective head 3 once every drum revolution in accordance with a digital command signal whose word-length is dependent upon the number of heads.

Numeral 7 represents the priority selection circuit having train approach terminal 7A, train arriving terminal 7B, and train departure terminal 7C. This circuit gives a priority sequence to the announcement command input signals received by each input terminal. An example of a priority sequence is as follows: ① Announcement for train departure > ② Announcement for train arrival, > ③ Announcement of train approach. The symbol U at a terminal refers to the up-train line, while D refers to the down-train line.

Figure 4:
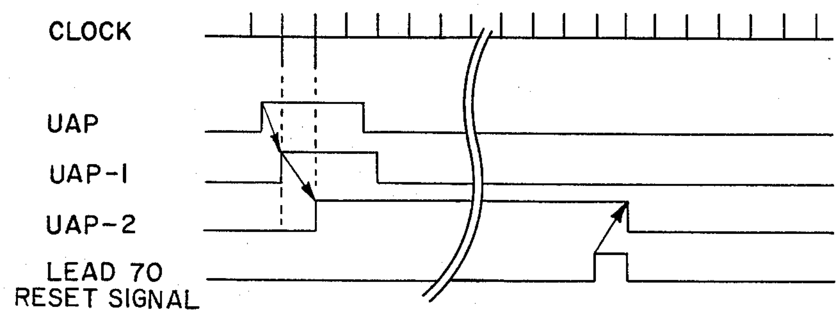
FIG. 4 illustrates a time chart for the circuit of FIG. 3.
Figure 3:
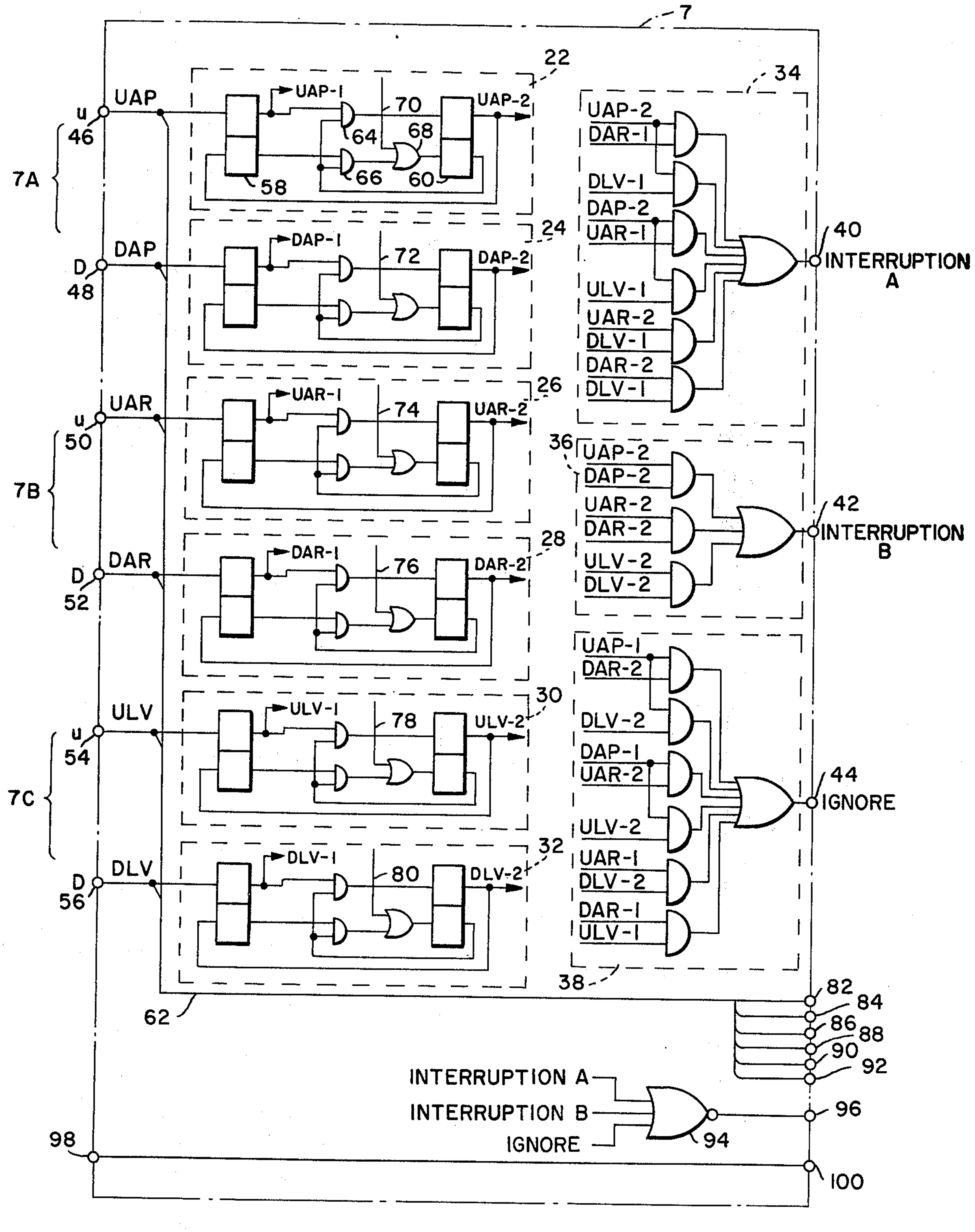
FIG. 3 is the diagram of a circuit which may be employed as the priority selection circuit illustrated in FIG. 1.

Although a computer may fulfill the function of priority selection circuit 7, a hard-wired circuit suitable for the task is illustrated in FIG. 3, with a corresponding timing chart being shown in FIG. 4. FIG. 3 illustrates six identical input circuits 22, 24, 26, 28, 30, and 32, along with three simple two-level output decoding circuits 34, 36, and 38 which receive signals from the input circuits. Circuit 34 generates an Interruption A signal, circuit 36 generates an Interruption B signal, and circuit 38 generates an Ignore signal, these priority signals being delivered respectively to output terminals 40, 42, and 44 and thence to control circuit 8. The operation of the AND and OR gates within output decoding circuits 34, 36, and 38 is well known within the art and hence further discussion of circuits 34, 36, and 38 is unnecessary.

With continuing reference to FIG. 3, input terminals 46, 48, 50, 52, 54, and 56 correspond to train approach terminals 7A, train arrival terminals 7B, and train departure terminals 7C of FIG. 1. The train approach signal UAP, applied to input terminal 46 to indicate that a train is approaching the platform on the up-train track, is an announcement command signal which may be obtained from a train-passing sensor disposed a suitable distance from the platform on the up-train tracks. Train-passing sensors which may be used are, of course, well known in the art, one type of sensor which can be advantageously employed being a track circuit for detecting when the rails of an electrically insulated section of track are being shorted by the axles of a passing train. Similarly, train approach signal DAP is an announcement command signal applied to input terminal 48 to indicate that a train is approaching the platform on the down-train track, and may be obtained from a train-passing sensor disposed a suitable distance from the platform on the down-train track. The up-train and down-train arrival signals UAR and DAR applied to the up-train arrival terminal 50 and down-train arrival terminal 52 respectively are announcement command signals which may be obtained from sensors positioned at the platform on the up-train and down-train tracks. Although the announcement command signals ULV and DLV applied to terminals 54 and 56 to indicate that a train is leaving might be obtained in several ways, it is convenient to logically AND a signal which goes "high" when the track leading from the station is clear with a bell trigger signal which goes "high" when the station master observes that the train is fully loaded and rings a bell to signal the engineer to depart. These signals UAP, DAP, UAR, DAR, ULV, and DLV are processed in identical manners by input circuits 22, 24, 26, 28, 30, and 32, respectively, so that it is appropriate to discuss only circuit 22 in detail in order to avoid redundancy.

With continuing reference to FIG. 3, it is to be understood that elements 58 and 60 are clocked flip-flops which are initially in the reset state so that their Q outputs are "0." When an up-train approaches the platform, the output of a suitably located train-passing sensor becomes "1," which is delivered as the announcement command input signal UAP to bus 62 within circuit 7 and simultaneously to flip-flop 58. The Q output of flip-flop 58, which become "1" at the first clock pulse after the signal UAP becomes "1," is delivered as the signal UAP-1 to the indicated gates of output decoding circuits 34 through 38 and simultaneously to one input of AND gate 64. Since the flip-flop 60 remains in the reset state, the output of AND gate 64 immediately becomes "1." The output of AND gate 66 is "0" except when both flip-flops are in the reset state. This "0" from AND gate 66 is supplied to one input of OR gate 68, which has a second terminal 70 for receiving an up-train approach announcement end signal which will eventually become "1" to reset flip-flop 60 after the approach announcement is completed. It will be apparent to those skilled in the art that flip-flop 60 will be set at the next clock pulse, providing a Q output of "1" to be delivered as signal UAP-2 to the indicated gates of output decoding circuits 34 through 38. The Q output of flip-flop 60 will remain "1," despite the fact that flip-flop 58 is reset after the train passes the sensor and the up-train approachment command input signal becomes "0," until the up-train approach announcement end signal is supplied to lead 70. In summary, it will be apparent to those skilled in the art that both UAP-1 and UAP-2 are clock-synchronized signals which are applied to output decoding circuits 34 through 38, UAP-1 being "1" substantially while UAP is "1" and UAP-2 being "1" substantially between the time UAP becomes "1" and the up-train announcement end signal becomes "1."

Input circuits 24 through 32 operate the same as circuit 22, discussed above. Signal DAP-1 of circuit 24, for example, becomes "1" the first clock pulse after the down-train approach announcement command input signal DAP becomes "1" to indicate that a train approaching the platform on the down-train tracks is passing the sensor. The signal DAP-1 remains "1" until the train has passed the sensor, while DAP-2 remains "1" until the arrival announcement end signal applied to lead 72 becomes "1." In addition to being supplied to circuit 24, the down-train approach announcement command input signal DAP is carried to output terminal 84 by bus 62 for later use by control circuit 8. In a similar manner, signals UAR-1, DAR-1, ULV-1, and DLV-1 are obtained from input circuits 26, 28, 30, and 32, respectively; leads 74, 76, 78, and 80 receive up-train arrival announcement end, down-train arrival announcement end, up-train departure announcement end, and down-train departure announcement end signals respectively; signals UAR-2, DAR-2, ULV-2, and DLV-2 are obtained from circuits 26, 28, 30, and 32 respectively; and signals UAR, DAR, ULV, and DLV are received by bus 62 for delivery to output terminals 86, 88, 90, and 92, respectively.

With continuing reference to FIG. 3, NOR gate 94 is provided with three inputs for receiving the priority signals from output decoding circuits 34, 36, and 38. Output terminal 96 connected to gate 94 becomes "1" to indicate that no priority signals are being received. A serial code received from the central command center (not illustrated) to indicate the number of the relevant train is supplied to input terminal 98 of priority selection circuit 7. This signal is available on output terminal 100 which, like the remaining output terminals of circuit 7, is connected to control circuit 8. It is noted that the various OR gates illustrated in FIG. 3 may be replaced by "wired" or "virtual" OR's in appropriate circumstances to further simplify the circuit.

Numeral 8 represents the control circuit, while 9 represents the memory, in which the train number, name of the train, platform number, destination, departure time of each train arriving or leaving the station during a day, name of the next station and various other messages for announcement are stored. (See Table 1)

Table 1 shows an example of announcement messages at the Kyoto Station for approach, arrival and departure of trains. The announcement blocks should be prepared so that it is possible to truncate or simplify a message in preparation for a succeeding announcement. Proper selection of message blocks allows messages to remain intelligible even though they are altered during announcement in the manner to be subsequently discussed.

TABLE 1

| Announcement block No. | Content of Announcement | Remarks |
|---|---|---|
| | (For announcement of train approach) | |
| a | To the track No. ( ) | |
| b | ( ) which will start at ( : ) for ( ) | |
| c | is approaching | |
| d | the train | Forming a simple message in combination with b. |
| e | In succession from the leading coach, the coaches are named as No. 1 | |
| f | and then No. 2 | |
| g | and the last coach | |
| h | is No. 16. | Forming a simple message in combination with e, f, g and i. |
| i | No. 11 and 12 coaches are GREEN cars. | |
| j | No. 1 to No. 4 coaches are for unreserved seats. | |
| | (For announcement of train arrival) | |
| 1 | Kyoto, Kyoto | |
| 2 | Kyoto, Kyoto | |

TABLE 1-continued

| Announcement block No. | Content of Announcement | Remarks |
|---|---|---|
| 3 | Thank you very much for your getting aboard. | |
| 4 | The train at the track No. ( ) is ( ) for ( ). | |
| | (For announcement of train departure) | |
| i | The train ( ) at the track NO. ( ) for ( ) | |
| ii | will start. | |
| iii | The door is closing. | |
| iv | Please be careful | |
| v | Next station is ( . ). | |
| | (Other announcements) | |
| 1' | One | |
| 2' | Two | |
| 3' | Three | |
| 8' | Tokyo | |
| 9' | Shin-Osaka | |
| 13' | Hikara | |
| 14' | Kodama | |

Numeral 10 represents the edition control circuit, which edits and outputs the command signals for controlling the voice change-over switch 5. Thus, the processing unit 11 is composed of the priority selection circuit 7, control circuit 8, memory 9 and edition control circuit 10. If desired, these elements may be included within a mini-computer, such as the Panafacom U-100 model.

Operation of an embodiment of this invention will now be explained, with the aid of the following example.

First, assume that the train Hikari No. 13, which will start at 17:53 for Hakata, is approaching the platform on the down track (No. 1 track) when there are no trains at the platform. When the train (Hikari No. 13) passes the train passing sensor which is provided at a certain distance from the station, the announcement command signal for informing about the approach of the train is issued from this sensor and impressed on the terminal D of the train approach terminal 7A of the priority selection circuit 7. This signal operates the control circuit 8 and thereby generates the announcement message pattern consisting of the blocks a, b, c, e, f, g, h, i and j by combining such blocks stored in the memory 9. Since each announcement block is comprised of certain combinations of several track numbers of the voice recording drum 2, the blocks a, b, c, e, f, g, h, i and j represent a combination of a series of the track numbers or, more accurately, a series of digital codes for addressing automatic message announcement system 1 to allow the proper tracks to be read-out so that the content of these blocks can be vocalized as a message.

At the same time the announcement command signal is inputted to priority selection circuit 7, as discussed above, a train number signal indicating the number of the relevant train is emitted to circuit 7. Although FIG. 3 illustrates a single input terminal 98 for receiving this signal and a single output terminal 100 for passing it on to control circuit 8, it is to be understood that the train number signal could be presented as parallel bits rather than serial bits. As is known in the art, there are several ways for automatically obtaining the number or other identifying codes from a passing train. U.S. Pat. No. 3,737,911, for example, discloses an apparatus for identifying response devices attached to passing objects. These response devices contain a number of elements having different resonance frequencies, and codes formed by these resonance frequencies are detected when the passing object moves by a stationary detecting device which includes a sweep frequency generator for interrogating the resonance frequencies. However, it is preferable to provide a computerized central signal center (not shown) which serves every station in the entire railroad system, centralized control of railroad systems being known in the art. See, for example, "Hitachi Review" Volume 24, Number 4 (April, 1975), pages 181 et seq. The central signal center stores the number of every scheduled train for the day in the scheduled sequence. The central signal center then retrieves the relevant train number and provides it to priority selection circuit 7 upon receiving the approach announcement command input signal indicating that the next train is approaching the platform. Similarly, the central signal center provides numbers for arriving and departing trains.

With the train number signal supplied as discussed above, digital codes for addressing the appropriate tracks of drum 2 in order to announce the train number, name of the train, the incoming track, destination, and time of departure stored in the memory 9 are read out and then sent to the edition control circuit 10. This signal is combined with the announcement message pattern at the said circuit and then edited, and finally sent to the voice change-over switch 5 as the command signal. With this command signal, the readout head 3 is changed each time the voice recording drum 2 makes a turn, and the message, "To the track No. 1, Hikari No. 13 which will start at 17:53 for Hakata is approaching. In succession from the leading coach, the coaches are named as No. 1 and then No. 2 and the last coach is No. 16. No. 11 and 12 coaches are GREEN cars, and No. 1 to No. 4 coaches are for unreserved seats," is announced from the loud-speakers 6.

When the train enters the track No. 1, the command signal for announcing the arrival of the train is issued and is inputted to the terminal D of train arrival terminal 7B of the priority selection circuit 7. This signal operates the control circuit 8 and thereby the announcement blocks listed in Table 1 stored in the memory 9 are combined and the message pattern consisting of 1, 2, 3 and 4 is generated. Since each block represents a combination of the track numbers, 1, 2, 3 and 4 are respectively the combination of a series of track numbers. Thus, the command signal for instructing the change-over in the sequence of track numbers is sent to the edition control circuit 10.

A signal identifying the number of the train which has just arrived is given to the priority selection circuit from the central signal center as explained above, and with this signal, the train number, name of the train, the incoming track number, and the destination stored in the memory 9 are read out and then given to the edition control circuit 10. This signal is given to said voice change-over switch 5 as the command signal at the said circuit. This command signal allows the read-out head 3 to be changed each time the voice recording drum 2 makes a turn, thereby the message, "Kyoto, Kyoto, Kyoto, Kyoto. Thank you very much for your getting aboard. The train at the track No. 1 is Hikari No. 13 for Hakata." is announced from the loudspeakers 6.

Then, if the train at the track number 1 is ready to leave, a command signal for announcing the departure (for example, using an AND signal of the train bell trigger signal and departure signal) is issued and is inputted to the terminal D among the train departure terminal 7C of the priority selection circuit 7.

This signal operates the control circuit 8, thereby the message pattern consisting of i, ii, iii, iv and v is formed by combining the announcement blocks stored in the memory 9. Since each announcement block is formed by combining track numbers, i, ii, iii, iv and v are respectively the combination of a series of track numbers. The command signal for controlling change-over switch 5 in accordance with these track numbers is sent to the edition control circuit 10. As already explained above, a signal identifying the number of the starting train is given to the priority selection circuit 7 from the central signal center. With this signal, the train number, name of train, track number, destination and next station stored in the memory 9 are read out and sent to the edition control circuit. This signal is further combined with the generalized information about the desired sequence of track numbers of drum 2 at the said circuit and then edited. Thereafter this signal is given to the voice change-over switch 5 as the command signal. This command signal causes the proper read-out head 3 to be selected each time the voice recording drum 2 makes a turn, and the message, "The train, Hikari No. 13 at the track No. 1 for Hakata will start. The door is closing. Please be careful. Next station is Shin-osaka." is announced from the loud speakers 6.

Another case will now be explained. Assume that the up-train at the platform must start while the down-train is approaching to the station, so that the announcements for the up-train and the down-train must both be conducted. In the present invention, priority is given to the messages for announcement. In other words, messages are given the following priority order; announcement of departure>announcement of arrival>announcement of train approach.

When one message is being announced while a different kind of message is required, interruption is carried out. For example, such interruption may be classified into the following categories in accordance with priorities:

Interruption A: Present announcement is interrupted immediately because of interruption having higher priority.

Interruption B: Interrupted message is announced at the same priority order.

Ignore: Interruption is ignored.

Table 2 shows the conditions where an interruption is issued to the present announcement.

TABLE 2

| Present Announcement \ Interrupting announcement | Announcement for train approach | Announcement for train arrival | Announcement for train departure |
|---|---|---|---|
| Announcement for train approach | Interruption B | Interruption A | Interruption A |
| Announcement for train arrival | Ignore | Interruption B | Interruption A |
| Announcement for train departure | Ignore | Ignore | Interruption B |

An example of interrupting operation will now be explained. Consider the case where the down-train arrives at the platform before the up-train, while the announcement about the approach of the up-train is being conducted and the up-train is approaching the station.

When the command signal for announcing the arrival of the down-train is inputted to the terminal D of the train arrival terminal 7B of the priority selection circuit 7 before the approach of the up-train has been completely announced, the priority selection circuit 7 judges the interruption in accordance with the priority order of announcement. In this case, the interruption is judged as the "Interruption A" as is shown in Table 2. This interruption request is sent to the control circuit 8. If this interruption is executed, for example, when the message, "to the track No. 1" is announced, the processing unit 11 immediately stops the program consisting of the track read-out sequence a, b, c, e, . . . of the voice recording drum 2 and changes the read-out sequence to a, d, c. Thus, the announcement message is simplified and thereafter is further changed by adding the read-out sequence 1, 2, 3 and 4. Therefore, the message, "to the track No. 1, the train is approaching. Kyoto, Kyoto. Kyoto, Kyoto. Thank you very much for your getting aboard. The train at the track No. 2 is . . . " is announced from the loud-speakers 6. Here, simplification of the message means that the announcement of a previously prepared message is interrupted, a shorter but adequate alternative is added and thus, a complete message which is shorter than said precedingly prepared message is produced.

Explained next is the case where the departure sign bell rings for the down-train after the departure sign bell of the up-train rings and the departure announcement is being made.

When the command signal for the departure announcement for the second train to leave is inputted to the terminal D of train departure terminal 7C of the priority selection circuit 7, the priority selection circuit 7 judges such interruption in accordance with the priority of announcement. In this case, the interruption is "Interruption B" as shown in Table 2. This interruption request is sent to the control circuit 8. Moreover, if this interruption is executed when the message, "The train Hikari No. 20 at the track No. 2 for Tokyo" is announced, the processing unit 11 interrupts the sequence i, ii, iii, iv and v for the voice recording drum 2 at the step i and changes the succeeding sequence to i, ii, iii and iv. Thereby, the message, "The train, Hikari No. 20 at the track No. 2 for Tokyo, the train Hikari No. 13 at the track No. 1 for Hakata will start. The door is closing. Please be careful." is announced from the loud speakers 6.

Shown above are examples where the message for the approach announcement is simplified and thus the announcement is completed and the announcement of an arrival is conducted preferentially, and where the announcement of a departure is interrupted and a combined departure announcement is made. According to this invention, where announcement messages are divided into adequate message blocks and further simplified messages are prepared, this invention is obviously effective to provide a variety of competent announcements.

The message format when an interruption is executed changes in accordance with what kind of announcement is presently being made, the difference in priority order of the interruption announcement and interruption timing.

FIG. 2 shows an announcement message edition processing flow chart which can be employed in processing unit 11, particularly an example of the flowchart for explaining the interrupting operation of the processing unit 11 in such a case where interruption is executed during announcement of one message in order to announce another message. As is clear from the flowchart, the message can have various formats.

As explained above, when it becomes necessary to announce one message during the announcement of another, the present invention is capable of combining messages or simplifying the interrupted message, and moreover is capable of announcing the message having the highest priority order by establishing priority according to the importance of the message, and also of making appropriate announcements within a short period of time since diversified messages can be prepared.

In addition, the preferred embodiment of this invention describes its application for providing information to railroad passengers. However, this invention is very effective as the announcement service for passengers at the airport, as the calling and guidance announcement at the motor pool, and as the transaction announcement at the market, etc.

We claim:

1. An automatic message announcement system for announcing the departure, arrival and approach of vehicles, comprising:

announcement command input signal generation means for generating announcement command input signals upon the departure, the arrival and the approach of vehicles;

priority selection circuit means for giving priority order to each said announcement command input signal and generating an interruption signal when a second announcement command input signal is generated while automatic announcement is being performed on the basis of a first announcement command input signal, the interruption level of said interruption signal depending on the priority order of the announcement command input signals;

a memory which stores codes corresponding to partial message announcement segments;

a processing means for reading out the memory content and composing a message pattern to be announced on the basis of the announcement command input signal and re-editing a new message pattern to be announced on the basis of the interruption level when said interruption signal is generated;

a voice recording medium for storing a plurality of voice elements; and voice edition control circuit means for controlling announcement of message patterns given from the processing means.

2. An automatic message announcement system according to claim 1, wherein said system announces the departure of trains, the arrival of trains, and the approach of trains at island type platforms.

3. An automatic message announcement system according to claim 2, wherein the announcement command input signal for train departures has higher priority than the announcement command input signal for train arrivals, and the announcement command input signal for train arrivals has higher priority than the announcement command input signal for train approaches.

4. An automatic message announcement system according to claim 1, wherein the priority selection circuit means comprises means for generating an interruption signal having a first interruption level where the priority order of the second announcement command input signal is higher than that of the first announcement command input signal, means for generating an interruption signal having a second interruption level when the priority order of the second announcement command input signal is equal to that of the first announcement command input signal, and means for generating an ignore signal when the priority order of the second announcement command input signal is lower than that of the first announcement command input signal.

5. An automatic message announcement system according to claim 4, wherein said processing means comprises means for simplifying a message pattern being announcement and composing a new message pattern in accordance with the second announcement command input signal when an interruption signal having the first interruption level is generated.

6. An automatic message announcement system according to claim 4, wherein said processing means comprises means for composing a new message pattern of a message being announced and the pattern corresponding to a second announcement command input signal when a interruption signal having the second interruption level is generated.

7. An automatic message announcement system for receiving announcement command input signals upon the approach, arrival, and departure of vehicles and serially combining a plurality of preselected message segments to produce approach, arrival, and departure messages respectively in response thereto, the announcement command input signals corresponding to the approach, arrival and departure messages being assigned different priorities, comprising:

priority selection circuit means responsive to said announcement command input signals for signalling the relative priority of an announcement command input signal which is received as a prior message is being announced;

memory means for storing codes corresponding to said plurality of message segments;

processing means for receiving said announcement command input signals and reading out the contents of said memory means to generate a series of codes corresponding to a message, said processing means additionally being responsive to said priority selection circuit means and comprising means for altering the code series of a message being announced following receipt of a new announcement command input signal unless said new announcement command input signal has a lower priority than the message being announced;

voice recording medium means for storing said plurality of message segments, said message segments corresponding to the codes stored in said memory means; and means responsive to said processing means for announcing messages from message segments stored in said voice recording medium.

8. The system of claim 7, wherein said priority selection circuit means comprises six port means for receiving announcement command input signals indicating the approach, arrival, and departure of up-trains and down-trains at an island-type platform, and wherein the announcement command input signals indicating train departures are assigned the highest priority, the announcement command input signals indicating train arrivals are assigned an intermediate priority, and the announcement command input signals indicating train approaches are assigned the lowest priority.

9. The system of claim 8, wherein said means for altering the code series of a message being announced shortens the code series of a message being announced if an announcement command input signal having higher priority is received, truncates the code series of a message being announced if an announcement command input signal having the same priority is received, and does not change the code series of a message being announced if an announcement command input signal having lower priority is received.

10. The system of claim 9, wherein said voice recording medium means comprises a rotatable drum having a plurality of tracks, said message segments being recorded on said tracks, and wherein said means for announcing messages comprises a plurality of read-out heads, each read-out head being disposed adjacent one of said tracks, and means responsive to said series of codes for consecutively activating a series of read-out heads.

11. The automatic message announcement system of claim 7, wherein said priority selection circuit comprises a plurality of input circuit means responsive to said announcement command input signals for producing first and second signals, and three output circuit means responsive to said first and second signals from said plurality of input circuit means for signalling the relative priority of messages.

12. The automatic message announcement system of claim 11, wherein the first signal produced by each of said plurality of input circuit means is a logical "1" substantially when the corresponding announcement command input signal is a logical "1," and the second signal produced by each of said plurality of input circuit means is a logical "1" substantially between the time the corresponding announcement command input signal became a logical "1" and the end of the corresponding announcement.

13. The automatic message announcement system of claim 12, wherein each of said plurality of input circuit means comprises a first flip-flop whose output Q is said first signal and a second flip-flop whose output Q is said second signal.

14. The automatic message announcement system of claim 13, wherein each of said output circuit means comprises a two-level AND-OR logic circuit.

* * * * *

UNITED STATES PATENT AND TRADEMARK OFFICE

CERTIFICATE OF CORRECTION

PATENT NO. : 4,276,572

DATED : June 30, 1981

INVENTOR(S) : Yoshiro Hayashi et al.

It is certified that error appears in the above-identified patent and that said Letters Patent are hereby corrected as shown below:

[57] abstract, line 15, "vehicles" should be --vehicle--.

Col. 3, line 33, delete ",".

Col. 6, line 11 of Table 1, "NO." should be --No.--.

Col. 7, line 29, "readout" should be --read-out--;
line 37, "loud-speakers" should be --loud speakers--;

Col. 9, line 19, "loud-speakers" should be --loud speakers--;

Col. 11, line 20, "when a" should be --when an--.

Signed and Sealed this

*First* Day of *December 1981*

[SEAL]

*Attest:*

GERALD J. MOSSINGHOFF

*Attesting Officer* *Commissioner of Patents and Trademarks*